United States Patent Office 2,807,642
Patented Sept. 24, 1957

2,807,642

METHOD OF SULFONATION TO PRODUCE INORGANIC SALT-FREE PRODUCT

Herman S. Bloch, Chicago, and Howard E. Mammen, North Riverside, Ill., assignors to Universal Oil Products Company, Des Plaines, Ill., a corporation of Delaware No Drawing. Application December 31, 1954, Serial No. 479,252

18 Claims. (Cl. 260—505)

This invention relates to a method of sulfonating organic sulfonatable compounds with sulfur trioxide as the sulfonating agent to produce a product substantially free of undesired by-products of the sulfonating agent. More specifically, the invention concerns a method of combining the excess sulfur trioxide introduced into the sulfonation reaction mixture with a reagent capable of forming a precipitate with such excess sulfur trioxide and which is separable from the sulfonation reaction mixture without affecting the quality of the desired sulfonated product.

An object of this invention is to produce a sulfonate free of by-products of the reaction of sulfur trioxide with reagents utilized in the process. Another object of the invention is to provide a process for producing substantially pure sulfonic acids, sulfate esters or neutral sulfate or sulfonate salts. Still another object of the invention is to produce the above indicated substantially pure sulfate, sulfonic acid or sulfonate products, utilizing a reagent which may be completely recovered in the process for recycling therein.

In one of its embodiments the present invention relates to a process for sulfonating a sulfonatable organic compound with sulfur trioxide, in which process the quantity of sulfur trioxide in the reaction mixture after completion of the sulfonation reaction is substantially eliminated which comprises contacting said sulfonatable organic compound with said sulfur trioxide at sulfonation reaction conditions, introducing into the sulfonation reaction mixture prior to the separation therefrom of the sulfonated product an inert liquid solvent of said sulfonated product, maintaining said solvent in liquid phase at the temperature and pressure utilized for the sulfonation reaction and upon the completion of said reaction, adding thereto an amide which resists sulfonation and which combines with the excess sulfur trioxide in the reaction mixture to form an addition complex therewith, and separating from the reaction mixture a precipitate consisting of said addition product.

A more specific embodiment of the invention is directed to a process for sulfonating an alkyl aromatic hydrocarbon with sulfur trioxide, said process comprising contacting a solution of said alkyl aromatic hydrocarbon in an inert liquid paraffinic hydrocarbon maintained in liquid phase at the reaction conditions for the process with a mixture of sulfur trioxide and an inert gaseous carrying agent, utilizing a proportion of alkyl aromatic hydrocarbon to inert liquid paraffinic hydrocarbon of from about 0.1 to 1 to about 1 to 1, effecting the resulting sulfonation reaction at a temperature of from −30° to 50° C., and after the addition of at least an equimolar proportion of sulfur trioxide to the alkyl aromatic hydrocarbon in the reaction mixture, adding to said mixture a quantity of dimethyl formamide equal to the quantity of sulfur trioxide in excess of the stoichiometric ratio of said sulfur trioxide to said alkyl aromatic hydrocarbon and separating from the reaction mixture a resulting precipitate consisting of the addition product of said dimethyl formamide with said excess sulfur trioxide.

It has been generally recognized in the sulfonation art that sulfur trioxide in its free form theoretically provides an ideal sulfonating agent because of its highly reactive nature and because it sulfonates organic compounds without the simultaneous production of water as a by-product, thus eliminating the formation of a sulfuric acid phase in the reaction mixture which is difficult to separate therefrom and which in the use of other sulfonating agents such as oleum, concentrated sulfuric acid, and others, represents a waste of reagent and involves useless processing procedure in separating the same from the sulfonation reaction mixture. It has also become apparent that in order to utilize sulfur trioxide directly as a sulfonating agent for most organic compounds, a means of controlling the extreme reactivity of the sulfur trioxide must be provided if the product is to be relatively free of colored impurities, such as resinous and carbonaceous discoloration products of the organic charging stock, for example, by diluting the sulfur trioxide with an inert liquid diluent which resists sulfonation and which may be maintained in substantially liquid phase by the proper selection of temperatures and pressures at which the sulfonation is effected.

Another means for controlling the reactivity of sulfur trioxide which may be utilized in conjunction with the aforementioned dilution of the charging stock with an inert liquid solvent comprises vaporizing the sulfur trioxide and mixing the resulting vapor with an inert gas which acts as a carrying agent and diluent for the sulfur trioxide. Suitable inert, liquid solvents for the organic charging stock include particularly the liquefied paraffinic and cycloparaffinic hydrocarbons, such as liquefied propane, n-butane, n-pentane, cyclopentane, n-hexane, cyclohexane, n-heptane, and other isomeric paraffinic hydrocarbons (or those of higher molecular weight) which are unreactive. The lower molecular weight members of the above series, particularly n-butane and n-pentane, are particularly preferred because these may be utilized in their liquefied form at the normally low temperatures required for sulfonation without the development of highly viscous reaction mixtures, a problem ordinarily associated with the absence of suitable solvent-diluents. Also utilizable in the process for such diluent purposes are mixtures of the above liquid or liquefied paraffins, such as a fraction of a petroleum distillate, containing, for example, $C_4$, $C_5$ and $C_6$ paraffinic hydrocarbons. Other suitable inert liquids utilizable as diluents of the organic charging stock to the sulfonation reaction are the halogenated analogs of the aforementioned paraffinic hydrocarbons, including the fluorinated, chlorinated or brominated analogs, or the mixed halogen derivatives, such as ethylene dichloride, tetrachloroethane, dichlorodifluoromethane, carbon tetrachloride, perfluorobutane, 2,2,3,3-tetrachlorobutane, and others.

Suitable gaseous carrying agents for the sulfur trioxide vapor are such inert materials as air, nitrogen, carbon dioxide, methane, ethane, propane, gaseous butane, a halogenated hydrocarbon analog such as difluoromethane, isopropylfluoride, fluorodichloroethane, methylene dichloride, etc. The sulfur trioxide may be conveniently suspended as a vapor within the gaseous carrying medium, for example, by bubbling the inert gas at the desired temperature into or through a bulk supply of liquid sulfur trioxide, the temperature at which the sulfur trioxide is vaporized and the rate of gas flow determining the concentration of sulfur trioxide in the resulting mixture of sulfur trioxide in the inert gas.

The present process is applicable to any feed stock which may be contacted with sulfur trioxide to effect sulfation or sufonation thereof at the reaction conditions found to be suitable for the reaction. In specifying herein a "sulfonation process," a "sulfonatable organic compound," a "sulfonating agent," and "sulfonating conditions," it is intended that the use of the term "sulfonate" and derivative terms include reactions in which sulfation is the end result of the process, as well as reactions in which sulfonation characterizes the end product. Thus, alcohols, when contacted with sulfur trioxide at "sulfonating" conditions, although actually "sulfated" in that a sulfate ester is the end product of the process, may also be considered as being "sulfonated" in view of the addition of at least 1 mol of sulfur trioxide to the alcohol to form the sulfate ester. Organic compounds within the broad class of sulfonatable organic charging stocks include such compounds as the phenols and alkyl phenols; alcohols of both the aliphatic and alicyclic series; aromatic hydrocarbons such as the various benzene derivatives containing a nuclearly displaceable hydrogen atom which may be occupied by a sulfo radical and the polycyclic aromatic hydrocarbons containing naphthyl, phenanthryl and anthryl nuclei; olefinic hydrocarbons, such as octene, decene, etc. and cyclo-olefins or their alkyl derivatives such as cyclohexene and ethylcyclohexene; heterocyclic compounds such as thiophene, pyridine and the like; ethers and esters such as phenylmethyl ether and the fatty acid glycerides, respectively, the latter class also including such compounds as the glyceride mono-ester of oleic acid, etc.; acids, such as benzoic acid and the aliphatic acids, particularly those containing an olefinic linkage such as oleic acid, and other compounds containing a replaceable hydrogen atom as well as various derivatives of the above classes of compounds containing non-interfering substituents, such as one or more halogen, nitro, amino, keto, carboxyl, etc. groups. The advantages of the present method of sulfonation are especially evident in the production of alkyl aromatic sulfonic acids which when neutralized with a suitable basic reagent, such as an alkali metal hydroxide, an amine, or an alkanol amine, form highly effective detergent compounds. Suitable alkyl aromatic hydrocarbons and alkylated phenols sulfonatable by the present process to form detergents or detergent intermediates include, among others, the alkylated mono- and bicyclic aromatic compounds and phenols such as nonylbenzene, decylbenzene, dodecylbenzene, dodecyltoluene, pentadecylbenzene, pentadecyltoluene, amylnaphthol, amylnaphthalene, nonylphenol, decylphenol and other long-chain substituted mono- and bicyclic aromatic hydrocarbons, phenols and naphthols.

The sulfated and sulfonated products of these charging stocks are ordinarily utilized in the form of their neutral salts of inorganic bases, such as sodium hydroxide, and when utilized as detergents for certain purposes, it becomes desirable in many instances to provide a product which is substantially free of inorganic salts such as the reaction product of the base and any excess sulfonating agent which may be utilized in effecting the sulfonation reaction, such as sodium sulfate formed by adding sodium hydroxide to a sulfonation reaction mixture containing an excess of the sulfonating agent. The present process wherein the excess sulfonating agent may be substantially removed from the sulfonation reaction mixture prior to neutralization of the sulfonated product with a base such as sodium hydroxide is particularly adapted to the formation of products which are substantially free of inorganic sulfates. By the methods herein provided, such products may be formed by highly economical procedures which conserve not only the sulfonating agent, but also the base utilized to neutralize the sulfonation reaction mixture after completion of the reaction.

The method comprising the present invention whereby the aforementioned conservation of sulfonating agent and neutralizing base is realized comprises adding to the sulfonation reaction mixture following the completion of the sulfonation reaction an organic carboxamide in an amount corresponding to the excess of sulfonating agent present in the reaction mixture. It is believed that the mechanism involved in the removal of excess sulfonating agent from the reaction mixture containing both the excess sulfur trioxide as well as the sulfonic acid or sulfate product is essentially the formation of an addition product between the sulfur trioxide and the amide, the latter addition product being insoluble in the inert liquid diluent, whereas the unaffected sulfonic acid or sulfate ester is soluble in the diluent-solvent. The addition product of sulfur trioxide and amide contains thermally decomposable chemical bonds, enabling the product to be subsequently heated to regenerate both the sulfur trioxide and the amide combined therewith. Suitable carboxamides for this purpose which combine with sulfur trioxide to form such addition products but are not sulfonated by the sulfur trioxide include the N,N-dialkyl fatty acid monocarboxamides containing up to about 6 carbon atoms per molecule of the aliphatic series of acids, the N,N,N'N'-tetralkylated dibasic acid diamides which are generally selected from those containing up to about 10 carbon atoms per molecule, these being more readily available than the higher molecular weight members of such series and also the mono-, di- and tribasic carboxamides of either the aliphatic or aromatic series containing amido groups having no N-hydrogen atoms. The amide is preferably one which is otherwise inert except to the extent of forming the addition product; that is, an amide which reacts in no other manner with the sulfur trioxide than to form the aforesaid addition product with sulfur trioxide. Thus, it is preferred that the organic residue of the amide attached to the carboxamido radical be free of olefinic unsaturation which would render the amide reactive in the presence of the sulfur trioxide to form sulfonation products or polymers of the amide, although other groups which do not react with sulfur trioxide, such as halogen, nitro, carbonyl, cyano, or other essentially inert radicals may be present in the organic residue without materially affecting the capacity of the amide to form an addition product thereof with the sulfur trioxide reagent. Typical aliphatic monocarboxamides utilizable as the sulfur trioxide scavenging agent in the present process include, for example, the N,N-dialkyl formamides, acetamides, propionamides, butyramides, isobutyramides, valeramides, caproamides, trimethylacetamides, and others. The amide should be a secondary monocarboxamide, representing the theoretical reaction product of a monocarboxylic acid with a secondary amine, less one mole of water of dehydration, including, for example, dimethylformamide, dimethylacetamide, dimethylpropionamide, dipropylpropionamide, etc. The carboxamide may also be an N,N,N'N'-tetra-alkyl diamide of such dibasic acids as oxalic, malonic, succinic, glutaric, adipic, pimelic, suberic, azelaic, sebacic acids, and others. Also included among the utilizable carboxamides are the aromatic derivatives corresponding to the reaction products of aromatic mono-, di- and tricarboxylic acids with secondary amines, such as the dialkylamides of benzoic, isophthalic, terephthalic, o-toluic, m-toluic, p-toluic, anisic, hemimellitic, trimellitic, trimesic, phenylacetic, hydrocinnamic, phenylbutyric, phenylenediacetic acids, etc. The types and varieties of carboxylic acid amides utilizable in the present process as the additive to the sulfonation reaction mixture are obviously considerable in number, since the amido group is the essential functioning portion of the amide additive and aside from limiting qualifications that the amide be such that its SO₃-complex is relatively hydrocarbon-insoluble and contain no other reactive group capable of undergoing other foreign reactions with the sulfur trioxide, the number of amides utilizable in the process is limited only by other factors, such as availability. Thus, under certain circumstances, sulfonamides such as those derived from benzenesulfonamide may also be employed as the additive to the sulfonation reaction mixture to combine with the sulfur trioxide to form an addition product therewith which is separable from the sulfonation reaction mixture as a distinct phase. The reaction of the amide additive with the sulfur trioxide is a substantially quantitative reaction and it is therefore necessary to add only an amount of amide equivalent to that which will theoretically react with the excess sulfur trioxide in a stoichiometric ratio therewith.

In effecting the actual sulfonation reaction, which precedes the addition of the amide to the sulfonation reaction mixture the sulfonatable organic charging stock is contacted with the sulfur trioxide at a temperature of from about −30° to about 100° C., preferably from about −10° to about 40° C., and preferably in the presence of the aforementioned inert liquid diluent, the sulfur trioxide also preferably being supplied in diluted form, mixed with an inert carrying gas, as hereinbefore described. A convenient means of conveying the sulfur trioxide into the sulfonation reactor comprises passing the inert gaseous carrying agent, as hereinabove specified, through a bulk supply of the sulfur trioxide which may be in liquid or solid form by bubbling the gas into the bottom of the container in which the $SO_3$ is stored and removing the mixture of gaseous carrying agent and sulfur trioxide vapor from the top of the container. The pick-up zone thus provided is preferably maintained at a temperature of from about 0° to about 45° C., the particular temperature utilized depending upon the concentration of sulfur trioxide desired in the gaseous carrying agent, which may range from 1 to about 50% by volume of the mixture, although it is particularly desirable to utilize concentrations within the range of from about 5% to about 20% of sulfur trioxide by volume of the total mixture. The gaseous mixture of sulfur trioxide and inert gas may be led into a well-stirred mixture of the organic compound to be sulfonated and the inert liquid diluent, or if preferred, the diluent may be added to the sulfonation mixture after partially or wholly completing the addition of sulfur trioxide to the organic charging stock and prior to the addition of amide thereto. In the first alternative procedure the diluent is present in the sulfonation mixture initially, diluting the charging stock and resulting in a more desirable sulfonation by eliminating the development of high temperature zones within the reaction mixture and the consequent production of highly colored sulfonation by-products. In the procedure wherein the inert liquid diluent is not added to the sulfonation reaction mixture until after all of the $SO_3$ has been charged thereto and just prior to addition of amide, the diluent serves the purpose of dissolving the desired sulfonation product therein and providing a medium from which the $SO_3$-amide addition product is readily precipitated. Both purposes may be effected also by adding the diluent after some, but not all, of the sulfonation has taken place, particularly when sufficient sulfonation has been effected to render the reaction mixture viscous. For the purposes of the present process it is essential that the inert liquid diluent be selected from the organic liquids in which the addition product of the sulfur trioxide to the amide additive is insoluble, thereby resulting in the precipitation of the amide addition product when the latter amide is added to the sulfonation reaction mixture following the completion of the reaction.

The active component of the sulfonating agent utilized in the present process which produces the sulfate or sulfonic acid derivative of the sulfonatable organic compound charged to the process is sulfur trioxide in any of its various physical modifications. This reagent has become commercially available in three forms: the so-called "alpha" form which is a solid asbestos-like material melting at 62° C. and generally considered to be a sulfur trioxide polymer, the "beta" form, believed to be a polymeric sulfur trioxide which is solid at normal temperatures and melts at about 33° C. and the "gamma" form which is a normally liquid physical modification of the sulfur trioxide at room temperature which melts at 17° C. Any of the above physical modification of sulfur trioxide may be utilized in the present process, particularly when suspended in the inert liquid carrying agent or when vaporized into the gaseous carrying agent in accordance with the procedure herein provided. The preferred reagent is the so-called "gamma" form which may be maintained in bulk supply in liquid form and through which the gaseous or liquid carrying agent may be passed to pick up the sulfur trioxide and carry it into the sulfonation zone.

The sulfur trioxide reagent, either suspended in or dissolved in the inert liquid carrying agent or suspended in vapor form in the inert gaseous carrying medium is supplied to the sulfonation zone in an amount corresponding to from about 1.0 to about 1.5 molecular proportions of sulfur trioxide per mol of organic charging stock when mono-sulfonation of the latter is desired. Although the reaction is generally completed after the addition of slightly more than about one molecular proportion after sufficient time of contact is permitted to complete the mono-sulfonation reaction, it is generally preferred to supply an excess of sulfur trioxide of from about 0.05 to about 0.5 mol of total sulfur trioxide per mol of charging stock to the reaction mixture initially, thereby completing the mono-sulfonation within a shorter reaction time. The excess sulfur trioxide may then be removed from the reaction mixture in accordance with the present process by the addition thereto of the amide additive, separating the resulting precipitate of sulfur trioxide-amide addition product from the solution of sulfonated organic charge stock in the inert diluent and thereafter recovering the sulfonated product from the inert diluent, for example by evaporation of diluent therefrom. The amide is added to the sulfonation reaction mixture preferably at a temperature of from about −10° to about 30° C., at which temperature the viscosity of the mixture is not excessive and yet the solubility of the amide-$SO_3$ salt in the inert liquid diluent is quite low.

The amide and sulfur trioxide may be recovered by heating the complex, preferably to a temperature not over about 100° C., so that each may be re-used in the process. If the complex is heated in the presence of an inert gas, such as air or nitrogen, the liberated $SO_3$ may be carried off therein and the stream of diluted $SO_3$ used for sulfonation as previously described. Alternatively, the amide-$SO_3$ complex may itself be used as a sulfonating agent by adding it directly to the next batch of material to be sulfonated, such as, for example, an alkylaryl hydrocarbon. In this case, the amide may be present while more $SO_3$ is added to complete the sulfonation; only when substantially no more sulfonatable hydrocarbon is present (i. e. when monosulfonation is substantially completed) will the amide be reprecipitated in stable form by excess $SO_3$.

The present invention is further illustrated with respect to several of its specific embodiments in the following examples, which, however, are intended merely for illustrative purposes without intending to unduly restrict the scope of the invention necessarily in accordance therewith.

*Example I*

Dodecyltoluene, being the propylene tetramer alkylate of toluene, boiling from 275° to 325° C. (260 g. or 1 mole) is dissolved in 5 volumes of n-butane solvent and the resulting solution placed in a sulfonation reaction vessel comprising a stirred reaction flask surrounded by an ice-salt mixture and having a chilled brine-cooled reflux condenser which maintains the temperature of the reaction solution at about 0° to about 5° C. In a separate vessel consisting of a bubbling tower or gas washing bottle surrounded by a water bath at 30° C. is placed 2 moles of liquid "Sulfan," the tradename for the liquefied gamma form of sulfur trioxide stabilized in such liquid form by the inclusion of a polymerization inhibitor therein. Gaseous n-butane is led into the sulfur trioxide bulk supply by bubbling the butane below the surface of the liquid sulfur trioxide through a warmed glass tube, the outlet tube from the gas washing bottle leading into the $SO_3$ inlet nozzle within the sulfonation reactor which is placed and maintained beneath the surface of the dodecyltoluene in the butane solution contained in the sulfonation reactor. Analysis of the gas mixture leaving the sulfur trioxide vaporizer and entering the sulfonation reactor indicates that it contains about 12% free sulfur trioxide vapor, the percentage of sulfur trioxide varying from 17% to 8% as the temperature of the bulk of $SO_3$ varies as a result of evaporative cooling.

As the sulfur trioxide vapor is admitted into the n-butane-dodecyltoluene solution in the sulfonation flask, the mixture is vigorously stirred with a motor-driven paddle, the temperature of the reaction mixture being maintained at from about $-1°$ to about $+2°$ C. during the course of the sulfonation. When approximately 1.5 mols of sulfur trioxide has been vaporized from the bulk supply of "Sulfan," addition of sulfur trioxide to the reaction mixture is discontinued and the mixture stirred for an additional 1.5 hours at a temperature of about 0° C. Following the above reaction period, dimethylformamide (0.5 mol, 36.5 g.) is added dropwise to the stirred sulfonation reaction mixture while the temperature is maintained at approximately 0° C. A solid precipitate forms from the first addition of dimethylformamide, the latter precipitate being filtered from the remaining butane solution of dodecyltoluene sulfonic acid. The filtrate is washed with three 50 cc. aliquots of cold normal butane in order to remove the soluble sulfonic acid therefrom.

The normal butane solution of dodecyltoluene sulfonic acid is neutralized to a pH of 7 by shaking the solution with 1 mol of aqueous sodium hydroxide and the latter aqueous solution separated from the residual normal butane and evaporated to dryness. Extraction of the dried residue with ethanol completely dissolves the dried salt, leaving only a trace of sodium sulfate, thereby indicating the substantial absence of sodium sulfate in the sulfonic acid product of the sulfonation reaction.

The dimethylformamide addition product of sulfur trioxide may be readily decomposed and the dimethylformamide recovered therefrom by the addition of a small amount of water to the addition product or by heating the same to the decomposition temperature and collecting the condensed vapors. Substantially all of the dimethylformamide may be recovered in this manner.

*Example II*

In a similar preparation of dodecyltoluene sulfonic acid as described above in Example I, the excess sulfur trioxide present in the sulfonation reaction mixture following completion of the reaction is removed therefrom as a butane insoluble precipitate by the addition of N,N-dimethylphenylacetamide to the sulfonation reaction mixture following the complete addition of the sulfur trioxide, in an amount corresponding to a stoichiometric equivalent of the excess sulfur trioxide, based upon mono-sulfonation of the dodecyltoluene. The recovered dodecyltoluene sulfonate formed by neutralization of the separated n-pentane solution of dodecyltoluene sulfonic acid recovered from the sulfonation product after the addition of the N,N-dimethylphenylacetamide thereto contained no appreciable residue of sodium sulfate when extracted with ethanol, following the neutralization of the dodecyltoluene sulfonic acid with sodium hydroxide.

We claim as our invention:

1. In the sulfonation of a sulfonatable organic compound with an excess of sulfur trioxide, the process of separating the excess sulfur trioxide from the sulfonation reaction mixture which comprises introducing an inert liquid diluent to the reaction mixture prior to the separation of the sulfonated product therefrom, adding to the diluent-containing reaction mixture, upon completion of the sulfonation reaction, an organic amide in an amount sufficient to react with said excess sulfur trioxide and form an addition product therewith, said inert diluent being an organic liquid in which the amide-$SO_3$ addition product is insoluble, whereby said addition product is precipitated, and separating the resultant precipitate from the reaction mixture.

2. In the sulfonation of long-chain alkyl aromatic hydrocarbons with an excess of sulfur trioxide, the process which comprises contacting the hydrocarbon, while dissolved in an inert paraffinic liquid, with the sulfur trioxide at a temperature of from about $-30°$ to about 100° C., adding to the reaction mixture, upon completion of the sulfonation, an organic carboxamide in an amount sufficient to react and form with the excess of sulfur trioxide in the mixture an addition product which is insoluble in said paraffinic liquid, and separating the resultant amide-$SO_3$ precipitate from the reaction mixture.

3. The process of claim 1 further characterized in that said sulfonatable organic compound is dissolved in said inert liquid diluent prior to the sulfonation thereof.

4. The process of claim 1 further characterized in that said inert diluent is a saturated hydrocarbon liquid.

5. The process of claim 1 further characterized in that said inert liquid diluent is a paraffinic hydrocarbon containing from 3 to about 10 carbon atoms per molecule.

6. The process of claim 1 further characterized in that said inert liquid diluent is a napthenic hydrocarbon.

7. The process of claim 1 further characterized in that said inert liquid diluent is a halogenated paraffin containing up to about 10 carbon atoms.

8. The process of claim 1 further characterized in that said amide is an N,N-dialkylamide.

9. The process of claim 1 further characterized in that said amide is an N,N,N'N'-tetra-alkyl-diamide.

10. The process of claim 1 further characterized in that said amide is an aliphatic fatty acid carboxamide containing not more than about 6 carbon atoms per molecule.

11. The process of claim 10 further characterized in that said carboxamide is a formamide.

12. The process of claim 11 further characterized in that said formamide is dimethylformamide.

13. The process of claim 10 further characterized in that said carboxamide is an acetamide.

14. The process of claim 10 further characterized in that said carboxamide is a phenylacetamide.

15. The process of claim 1 further characterized in that said amide is added to the sulfonation reaction mixture after completion of the sulfonation at a temperature of from about $-10°$ to about 30°.

16. The process of claim 1 further characterized in that said sulfonatable organic compound is an alkyl aromatic hydrocarbon.

17. The process of claim 16 further characterized in that said alkyl aromatic hydrocarbon is dodecyltoluene.

18. The process of claim 16 further characterized in that said alkyl aromatic hydrocarbon is dodecylbenzene.

References Cited in the file of this patent

UNITED STATES PATENTS

| | | |
|---|---|---|
| 2,514,733 | Vold et al. | July 11, 1950 |
| 2,573,675 | Bloch et al. | Nov. 6, 1951 |